United States Patent

Takada et al.

Patent Number: 5,152,822
Date of Patent: Oct. 6, 1992

[54] SLOW RELEASE OXAMIDE FERTILIZER

[75] Inventors: Yutaka Takada; Tatsuo Suehiro; Koichi Tsuboi, all of Yamaguchi; Teruyuki Matsuoka, Osaka; Akihiko Okazaki; Tomoharu Nomura, both of Yamaguchi, all of Japan

[73] Assignees: Ube Industries, Ltd.; Ube Compound Chemical Fertilizer Meg. Co. Ltd., both of Yamaguchi, Japan

[21] Appl. No.: 441,895

[22] Filed: Nov. 27, 1989

[30] Foreign Application Priority Data

Nov. 25, 1988 [JP] Japan ................. 63-298591

[51] Int. Cl.$^5$ ................................ C05G 3/00
[52] U.S. Cl. ..................... 71/27; 71/64.03; 71/64.13
[58] Field of Search ............ 71/64.01, 64.02, 64.03, 71/64.13, 27; 264/15, 143

[56] References Cited

U.S. PATENT DOCUMENTS 4,008,064  2/1977  Skauli .................. 71/64.02 X

FOREIGN PATENT DOCUMENTS 169527  9/1984  Japan.

Primary Examiner—Ferris Lander
Attorney, Agent, or Firm—McAulay Fisher Nissen Goldberg & Kiel

[57] ABSTRACT

An improved slow release oxamide fertilizer comprising an oxamide powder bonded by polyvinyl alcohol in a ratio of 0.2–10 weight parts of polyvinyl alcohol per 100 weight parts of oxamide is disclosed. The oxamide fertilizer is in the shape of spherical particles having an average minor diameter of 2 to 5 mm, and not less than 70% of total numbers of the particles have shapes in a ratio of major diameter to minor diameter of 1 to 1.3. The oxamide fertilizer has a respose angle not greater than 39°.

6 Claims, No Drawings

SLOW RELEASE OXAMIDE FERTILIZER

BACKGROUND OF THE INVENTION

This invention relates to a slow release fertilizer containing oxamide and a process for the preparation of the same.

Oxamide [$(CONH_2)_2$] is excellent as a component of slow release fertilizers owing to the low solubility thereof in water. To enhance the slow-releasing property of fertilizers, the fertilizers are generally preferred to be not powdered but granulated. To use the granular fertilizers, the fertilizers preferably have high hardness so as not to powder in the handling thereof. However, the oxamide is usually obtained in the form of a powder having a rigid surface, so that it is difficult to make the oxamide powder to adhere to each other to give a granular form. In the case that the oxamide is processed to form into spherical particles by industrially available granulating processes such as a rolling granulating process and a fluid granulating process, it is difficult to obtain a granular oxamide having a preferable hardness. The oxamide cannot be also granulated by a melt injection process, since the oxamide is decomposed under heating at a high temperature.

Japanese Patent Provisional Publication No. 59(1984)-169527 disclose a granular oxamide which comprises an oxamide powder bonded by polyvinyl alcohol in an amount of 0.2 to 10 wt. % of the oxamide powder, and a process for the preparation of the same which comprises granulating a mixture containing an oxamide powder and polyvinyl alcohol in an amount of 0.2 to 10 wt. % of the oxamide powder.

According to the process described in the above publication, there is obtained a granular oxamide having a shape of round bar at a length of 2 to 5 times as much as the particle diameter thereof (in an aspect ratio of 2 to 5). The granular oxamide has a particle diameter of 1.2 mm and a hardness of 0.6 to 1.9 kg. in the examples disclosed in the publication. The granular oxamide has such advantages that it has a hardness sufficient for handling, it is resistant to collapse in water and it hardly floats therein. Especially, the granular oxamide can be advantageously used as a component material of compound fertilizers.

However, the above-mentioned granular oxamide tends to have insufficient fluidity, because the shape thereof is a round bar, and in a certain case the insufficient fluidity thereof is unfavorable for mechanical fertilization. Further, the oxamide in such form is easily mineralized by action of soil microorganisms and hardly to give the slow release property, since the oxamide particle has a larger surface area per unit weight than that of a spherical particle due to its shape of round bar and is smaller in volume.

SUMMARY OF THE INVENTION

It is an object of the present invention to provide a slow release oxamide fertilizer which contains oxamide as a main component, which is almost spherical in shape.

It is another object of the invention to provide a slow releas oxamide fertilizer further having a hardness sufficient for handling as well as having a large particle diameter.

The present invention provides a slow release fertilizer which comprises an oxamide powder bonded by polyvinyl alcohol in a ratio of 0.2-10 weight parts of polyvinyl alcohol per 100 weight parts of oxamide and is in the shape of spherical particles, said spherical particles having an average minor diameter of 2 to 5 mm, not less than 70% (preferably not less than 80%) of total numbers of which have shapes in a ratio of major diameter to minor diameter of 1 to 1.3 and said powder having a repose angle not greater than 39° (preferably not greater than 38.5°).

The above-mentioned slow release oxamide fertilizer can be advantageously prepared by a process comprising the steps of:

(1) molding by extrusion a mixture containing an oxamide powder and polyvinyl alcohol in a ratio of 0.2–10 weight parts of polyvinyl alcohol per 100 weight parts of oxamide to give a shape of a round bar (or cylinder) having a diameter of 1.5 to 8 mm;

(2) cutting the molded product obtained in the step (1) above at a length of 1 to 1.5 times the diameter thereof to obtain a granular molded product; and (3) converting the granular molded product obtained in the step (2) above into spherical particles by means of a rolling granulator to give the desired powder.

Preferable embodiments of the present invention are given below.

In the slow release fertilizer of the invention, the oxamide powder has an average hardness of not less than 1.5 kg, preferably not less than 2.0 kg.

In the slow release fertilizer of the invention, not less than 45 wt. % of total particles thereof have minor diameters in the range of 2.4 to 5 mm.

In the process of the invention, the rolling granulator is a high-speed rolling granulator equipped with a rotary plate on the bottom of a fixed cylindrical container and performs rolling granulation by rotating the rotary plate at a high speed of not less than 300 r.p.m.

In the process of the invention, the mixture is granulated by means of the rolling granulator at 300 to 1,000 r.p.m. for 1 min. to 30 min.

In the process of the invention, the obtained particles are dried after the step (3).

DETAILED DESCRIPTION OF THE INVENTION

The slow release fertilizer of the present invention comprises at least an oxamide powder bonded by polyvinyl alcohol and in the shape of spherical particles.

The slow release fertilizer is necessary to be spherical particles having an average minor diameter in the range of 2 to 5 mm. Not less than 45 wt. % of total particles of the fertilizer preferably have a minor diameter in the range of 2.4 to 5 mm. When the average minor diameter of the particles is less than 2 mm, the particles are small in volume and easily mineralized so that the appropriate property of slow release may not be obtained. When the average minor diameter is more than 5 mm, in compression is sometimes poor and the sufficient hardness is not given to the obtained particles. Accordingly, both are not favorable. It is known that fertilizers are generally absorbed in the mineralized state by plants, and the fertilizers show good slow release as they are resistant to mineralization.

The slow release fertilizer of the invention in the form of an oxamide powder preferably has an average hardness of not less than 1.5 kg., preferably not less than 2.0 kg., wherein the hardness is expressed by an applied weight value at which the particles are collapsed. Such value can be measured by a Kiya-model hardness meter. When the average hardness is less than 1.5 kg., the fertilizer is sometimes destroyed in the course of handling on packing and transportation after the preparation thereof.

It is required for not less than 70% (preferably not less than 80%) of total numbers of the spherical particles of the slow release fertilizer to have a ratio of major diameter to minor diameter (major diameter/minor diameter) in the range of 1 to 1.3. When the value of major diameter/minor diameter is above said range, the fluidity of the particulate material decreases owing to increase in the repose angle, or the fertilizer is easily mineralized by soil microorganisms owing to increase of a surface area per unit weight thereof. Accordingly, a ratio exceeding the upper limit is unfavorable. From the viewpoint of the fluidity of the particulate material, the slow release fertilizer particles preferably have a repose angle of not larger than 39°. The fertilization using a machine can be advantageously performed depending upon the repose angle of not larger than 39°.

The slow release fertilizer may further contain a component having the effect of a fertilizer (hereinafter called a fertilizer component) other than oxamide together with the oxamide, provided that the component is sparingly soluble in water. Examples of such fertilizer component which is sparingly soluble in water include magnesian ammonium phosphate, crotonylidene diurea (CDU), isobutyridene diurea (IB), fused phosphate and potassium silicate. The slow release fertilizer may contain at least one of these fertilizer components springly soluble in water together with oxamide. If the slow release fertilizer contains a water-soluble fertilizer component, the water-soluble fertilizer component is dissolved in soils in preference to other and the particles rapidly collapse, so that the mineralization of the fertilizer by soil microorganisms is accelerated.

The above-mentioned slow release fertilizer can be advantageously prepared by a process which comprises the steps of:

(1) molding by extrusion a mixture containing an oxamide powder and polyvinyl alcohol in the shape of a round bar having a diameter of 1.5 to 8 mm;

(2) cutting the molded product obtained in the step (1) at a length of 1 to 1.5 times as long as the diameter thereof to obtain a granular molded product; and (3) shaping the granular molded product obtained by the step (2) into spherical particles by means of a rolling granulator.

The step (1) can be conducted by known methods such as the method described in the aforementioned Japanese Patent Provisional Publication No. 59(1984)-169527. For example, the step (1) is preferably conducted as follows.

In the step (1), a water-soluble polyvinyl alcohol powder is usually added to an oxamide powder in an amount ranging from 0.2 to 10 weight parts, preferably ranging from 2 to 5 weight parts, per 100 weight parts of the oxamide, and they are well mixed by means of a mixer. When the addition amount of the polyvinyl alcohol is below said range, the effect of bonding the oxamide powder is small and the hardness of spherical particles to be obtained is insufficient. When the addition amount of the polyvinyl alcohol is above said range, granules are apt to adhere to each other in the cutting procedure of a molded product obtained by hereinafter-stated extrusion molding and it is difficult to obtain granules at the aimed sizes. The polyvinyl alcohol may be added in a powder state or in the state of an aqueous solution. The addition process of the polyvinyl alcohol may be any of a batch process and a continuous process.

In the case of adding the aforementioned fertilizer component other than the oxamide, the component is preferably added to oxamide at the same time as the addition of the polyvinyl alcohol. The fertilizer component can be added thereto in an appropriate amount, so long as the bonding of the oxamide powder by the polyvinyl alcohol is not disturbed.

An apparatus used in the mixing procedure preferably is a twin rotor-type mixer.

It is preferred that water is added to the obtained mixture and they are further kneaded prior to the extrusion molding. The addition of water in the reasonable amount to the mixture produces adhesion in the polyvinyl alcohol, so that the oxamide powder and the other fertilizer component can be suitably bonded.

The addition amount of water is preferably in the range of 10 to 40 weight parts, more preferably in the range of 30 to 35 weight parts, per 100 weight parts of the oxamide powder in the mixture. When the polyvinyl alcohol is added in the form of an aqueous solution as mentioned above, the total of the amount of water contained in the aqueous solution of the polyvinyl alcohol and the amount of water newly added should be within said range for the amount of the oxamide powder in the mixture.

The kneading procedure is preferably conducted following the mixing procedure and using the same apparatus as used therein. In performing the kneading procedure, it is desired to knead well the polyvinyl alcohol and the fertilizer component such as the oxamide powder in order to obtain a molded product having a sufficient hardness in the next extrusion molding.

After completion of the kneading procedure, the kneaded material is quantitatively and continuously fed to a extrusion granulator and molded by extrusion to give a shape of a stick at a diameter of 1.5 to 8 mm.

The extrusion molding is preferably conducted in such a two-stage procedure that the kneaded material is first pre-compressed (i.e., roughly molded) by means of a fore extrusion-type molding machine at a dice diameter of 5 to 10 mm and then properly molded by means of a fore extrusion-type molding machine at a dice diameter of 1.5 to 8 mm. The pre-compression step is not always necessary, but preferable to perform for obtaining particles having increased hardness. The molding machine used in the rough molding may basically have the same function as that of the molding machine used in the following main molding, and is so adjusted that the diameter of the roughly molded product is larger than that of the molded product in the succeeding step.

The fore extrusion-type molding machine is preferably a screw-type extrusion molding machine. It is further preferable to use a twin screw-type extrusion molding machine in the rough molding as well as the main molding, because the twin-screw type is superior to a single-screw type with respect to compressive force and shearing force.

In the step (2), the molded product obtained in the step (1) is cut at a length of 1 to 1.5 times the diameter of the round bar to obtain a granular molded product in order to make it easy to shape the molded product into a sphere.

The cutting procedure is preferably conducted by cutting the molded product which comprises the mixture containing the oxamide powder and polyvinyl alcohol and is extruded in the shape of a stick having a diameter of 1.5 to 8 mm from the molding machine in the extrusion molding procedure, to give a length of 1 to 1.5 times the diameter thereof at the outlet of the molding machine.

When the molded product obtained by the extrusion molding procedure is not cut at the outlet of the molding machine, the molded product is cut by its own weight to obtain a round bar molded product at a length of about 10 to 30 cm. The cutting procedure may be conducted by feeding the molded product to a dram which a rotary cutter is built into and cutting it at a length of 1 to 1.5 times the diameter thereof.

If the molded product in the form of a round bar obtained in the step (1), which is about 10 to 30 cm long, is not cut in the granular shape and fed to a high-speed rolling granulator in the next step, the obtainable particles tend to have ratios of major diameter to minor diameter (major diameter/minor diameter) of about 2 to 3. Thus, the aimed spherical particles are hard to obtain and it is not favorable.

In the step (3), the granular molded product obtained in the step (2) is shaped into spherical particles preferably by means of a high-speed rolling granulator.

It is preferred that the high-speed rolling granulator is equipped with a rotary plate on the bottom of a fixed cylindrical container and can perform rolling granulation by rotating the rotary plate at a high speed of not less than 300 r.p.m. As such an apparatus, there is mentioned, for example, Marmelizer available from Fuji Poudal Co., Ltd.

When the rotary plate is rotated at a high speed of not less than 300 r.p.m., corners of the granular molded product fed to the granulator are removed by collisions with a sidewall of the cylindrical container of the granulator or collisions with other granules and further rolling frictions, and the molded product is gradually shaped into a sphere having almost the same diameter as that of the round bar of the molded product.

The procedure of shaping the granular molded product into spherical particles (i.e., sphering) is preferably conducted by a batch process, and usually by means of the high-speed rolling granulator capable of treating 50 to 1,000 kg. of the molded product at a time. The procedure is preferably done at a number of revolutions of the rotary plate of 300 to 1,000 r.p.m. for 30 sec. to 30 min. The procedure is done for a short operating time in the case of large numbers of revolutions and for a long operating time in the case of small numbers of revolutions, within said ranges.

By the above procedure, there can be advantageously prepared spherical particles which have an average minor diameter of 2 to 5 mm, and not less than 80% of the total of which have shapes to give a ratio of major diameter to minor diameter (major diameter/minor diameter) ranging from 1 to 1.3.

If the number of revolutions of the rotary plate is less than 300 r.p.m. or the operating time is less than 1 min., the sphering becomes so insufficient that it is apt to obtain particles in the shape of a slender spheroid in a ratio of major diameter to minor diameter of not less than 1.3, or to obtain round bar-particles whose corners are not removed.

If the number of revolutions of the rotary plate is more than 1,000 r.p.m. or the operating time is more than 30 min., particles may adhere to each other to become the state of a dumpling and further adhere to the side-wall of the cylindrical container of the granulator owing to advanced compression of the particles and oozing of water inside the particles onto the surfaces thereof, so that the operational capability may decrease.

The water inside the particles tends to ooze onto the surfaces thereof, even when operating at a number of revolutions and for an operating time within the above-mentioned preferable ranges. In order to prevent the interference of the water, it is preferable that a dry oxamide powder is added during the procedure. The addition amount of the dry oxamide powder depends on the conditions of the water, and is preferably in the range of 5 to 20 weight parts per 100 weight parts of the oxamide contained in the granular molded product fed to the granulator.

The granules having been compressed in the course of the extrusion molding can be further compressed by the high-speed rolling granulation to obtain spherical particles in the above-mentioned shape and at an average hardness of not less than 1.5 kg.

It is preferable that the spherical particles are further subjected to a drying treatment in a heated air stream. The drying treatment may be, for example, conducted by drying the particles at a temperature of 80° to 150° C. for 15 to 60 min., or by such a two-stage procedure that the particles are first dried at a temperature of 80° to 100° C. for 1 to 3 hrs. and then at a higher temperature of 140° to 160° C. for 10 to 30 min. In the drying treatment, there can be used a drying machine such as a rotary dryer, a fluid dryer or a constant temperature box dryer. The heat treatment can result in the drying of excess water having come up on the surfaces of the particles from the inside thereof by the high-speed rolling. The heat treatment also brings about such an effect that the adhesion of the oxamide powder by the polyvinyl alcohol is enhanced in the spherical particles, so that the hardness thereof can further increase.

Some care should be taken in the heat treatment, because embrittlement may occur on films of the polyvinyl alcohol and the mechanical strength thereof is apt to decrease, when the heat treatment is conducted at a drying temperature of higher than 150° C. for a long period.

The spherical particles, if necessary depending on the purpose, may be further adjusted so as to make the particle size thereof uniform. The adjustment of particles can be conducted by removing coarse particles and fine particles by means of a vibrating sieving machine. The removed coarse and fine particles can be reused as raw materials of the slow release fertilizer of the invention.

The fertilizer of the present invention is resistant to collapse or powdering by the handling in the process of from the preparation to the fertilization because of high hardness thereof, so that the fertilizer can be used as not only a raw material of compound fertilizers but also a slow release fertilizer as such or a raw material for bulk blend.

The fertilizer of the invention, most of the particles of which have been granulated in the almost spherical shape, has a small repose angle and a good fluidity suitable to mechanical fertilization.

Further, the fertilizer of the present invention is resistant to decomposition (i.e., mineralization) by soil microorganisms and has the excellent slow-releasing property as fertilizer, since the fertilizer is almost spherical in shape and the particles thereof are large in size.

Examples of the present invention and comparison examples are given below.

EXAMPLES 1 to 13

To 100 weight parts (1 kg.) of an oxamide powder was added a water-soluble polyvinyl alcohol powder to mix them for 2 min. by means of a twin rotor-type mixer, followed by adding water to the mixture and continuously kneading them for about 5 min. The amounts of the added water-soluble polyvinyl alcohol powder and water are set forth in Table 1.

The obtained mixture was then quantitatively and continuously fed to an extrusion molding machine to extrusion mold. The extrusion molding was conducted by first pre-compressing (roughly molding) the mixture by means of a fore extrusion-type twin-screw granulator having a dice diameter of 5 mm and then further molding the mixture by means of a fore extrusion-type molding machine having a dice diameter of 3 mm, and the obtained molded product was cut at a length of 3 to 4.5 mm at the outlet thereof to obtain granules. The cutting was done by means of a rotary cutter.

The granules were fed to a high-speed rolling granulator to be converted in the form of spheres. As the high-speed rolling granulator, Marmelizer available from Fuji Poudal Co., Ltd. was used. Since water oozed out on the surfaces of the granules in the granulating procedure, a dry oxamide powder was added thereto. The number of revolutions of the rotary plate, the operating time and the adding amount of the oxamide powder are set forth in Table 1.

Subsequently, the obtained spherical particles were dried by means of a box thermostat dryer. The drying was conducted first at 100° C. for 3 hrs. and then at 150° C. for 15 min. in order to increase the mechanical strength of polyvinyl alcohol film in the spherical oxamide particles.

After drying is complete, hardness of the obtained particles was measured by means of a Kiya-model hardness meter. From the particles were removed coarse particles and fine particles using a vibrating sieving machine, and particle size distribution of the particles was measured. The used sieve had an upper screen of 5 mm and a lower screen of 2.4 mm. The measured hardness and particle size distribution are set forth in Table 2.

A repose angle of the particles of 2.4 to 5 mm obtained in the measurement of particle size distribution was measured based on the discharge method. One hundred in number among the particles of 2.4 to 5 mm obtained in the measurement of particle size distribution were arbitrarily selected and a ratio of major diameter to minor diameter (major diameter/minor diameter) thereof was measured. The repose angle and the major diameter/minor diameter ratio are set forth in Table 2, wherein the ratio is indicated by numbers of particles in the ratio of 1 to 1.3 and in the ratio of not less than 1.3.

COMPARISON EXAMPLES 1 to 3

To an oxamide powder was added a polyvinyl alcohol powder to mix them followed by adding water to the mixture to knead them, and the mixture was then extrusion molded and cut to obtain granules, in the same manner as described in Example 1. The adding amounts of the polyvinyl alcohol powder and water are set forth in Table 1.

The granules were fed to a tilting tray-type granulator SUS304 model at a diameter of 50 cm and a depth of 10 cm to form into spheres. Since water appeared on the surfaces of the granules in the sphering procedure, a dry oxamide powder was added thereto. The number of revolutions of the rotary plate, the operating time and the amount of the added oxamide powder are given in Table 1.

The obtained particles were dried and measured on the hardness and the particle size distribution in the same manner as described in Example 1. Further, the particles of 2.4 to 5 mm obtained in the measurement of particle size distribution were measured on the repose angle and the major diameter/minor diameter ratio in the same manner as described in Example 1. The results are set forth in Table 2.

TABLE 1

|  | Composition | | Conditions of Sphering Procedure | | |
| --- | --- | --- | --- | --- | --- |
|  | Amount of PVA (wt. part) | Amount of Water (wt. part) | Number of Revolutions (r.p.m.) | Operating Time | Amount of Dry Powder (wt. part) |
| Example |  |  |  | (sec.) |  |
| 1 | 2 | 31 | 300 | 900 | 19 |
| 2 | 2 | 31 | 500 | 150 | 10 |
| 3 | 2 | 31 | 1000 | 90 | 10 |
| 4 | 2 | 33 | 300 | 150 | 13 |
| 5 | 2 | 33 | 400 | 90 | 11 |
| 6 | 2 | 33 | 500 | 50 | 9 |
| 7 | 2 | 33 | 600 | 50 | 10 |
| 8 | 2 | 33 | 700 | 40 | 8 |
| 9 | 2 | 33 | 800 | 50 | 9 |
| 10 | 2 | 33 | 900 | 40 | 11 |
| 11 | 2 | 33 | 1000 | 40 | 11 |
| 12 | 2 | 35 | 1000 | 40 | 16 |
| 13 | 3 | 31 | 1000 | 60 | 5 |
| Com. Ex. |  |  |  | (hrs.) |  |
| 1 | 2 | 31 | 30 | 3 | 3 |
| 2 | 2 | 33 | 30 | 3 | 5 |
| 3 | 2 | 35 | 30 | 3 | 7 |

Amount of Dry Powder: adding amount of the dry oxamide powder

TABLE 2

| | Particle Size Distribution | | | |
| --- | --- | --- | --- | --- |
|  | not less than 5 mm (wt. %) | 5 to 2.4 mm (wt. %) | not more than 2.4 mm (wt. %) | Average Hardness (kg.) |
| Example |  |  |  |  |
| 1 | 0 | 86 | 14 | 2.0 |
| 2 | 0 | 79 | 21 | 2.3 |
| 3 | 0 | 51 | 49 | 2.7 |
| 4 | 8 | 84 | 8 | 2.4 |
| 5 | 6 | 84 | 10 | 2.2 |
| 6 | 6 | 84 | 10 | 2.2 |
| 7 | 1 | 71 | 28 | 2.0 |
| 8 | 2 | 71 | 27 | 2.0 |
| 9 | 2 | 76 | 22 | 2.5 |
| 10 | 1 | 71 | 28 | 2.5 |
| 11 | 1 | 59 | 40 | 2.2 |
| 12 | 2 | 49 | 49 | 2.1 |
| 13 | 1 | 72 | 27 | 2.1 |
| Com. Ex. |  |  |  |  |
| 1 | 0 | 45 | 55 | 1.3 |
| 2 | 5 | 59 | 36 | 1.5 |
| 3 | 7 | 63 | 30 | 1.5 |

| | Major Diameter/Minor Diameter Ratio | | |
| --- | --- | --- | --- |
|  | 1 to 1.3 (number) | not less than 1.3 (number) | Repose Angle (°) |
| Example |  |  |  |
| 1 | 71 | 29 | 38.5 |
| 2 | 95 | 5 | 38 |
| 3 | 100 | 0 | 38 |
| 4 | 83 | 17 | 38.5 |
| 5 | 96 | 4 | 38 |
| 6 | 99 | 1 | 38 |
| 7 | 100 | 0 | 38 |
| 8 | 99 | 1 | 38 |

TABLE 2-continued

| | | | |
|---|---|---|---|
| 9 | 100 | 0 | 38 |
| 10 | 100 | 0 | 38 |
| 11 | 100 | 0 | 38 |
| 12 | 100 | 0 | 38 |
| 13 | 100 | 0 | 38 |
| Com. Ex. | | | |
| 1 | 2 | 98 | 40 |
| 2 | 12 | 88 | 40 |
| 3 | 18 | 82 | 40 |

Average Hardness: measured by means of the Kiya-model hardness meter

REFERENCE EXAMPLE 1

The spherical particles at an average minor diameter of 2.4 to 5 mm obtained in Example 1 were further sieved to prepare three kinds of particles, at an average minor diameter of 3 mm, 3.7 mm and 4.6 mm, respectively. Using these particles, a coefficient of mineralization (amount of a mineralized fertilizer in cumulative weight %) by soil microorganisms was measured under the following conditions.

Soil under test: Futsukaichi soil.
pH (H$_2$O): 5.4.
Fertilizing amount: 30 mg. in conversion to nitrogen for 100 g. of dry soil.
Water content: 120% of MWC.
Temperature: 30° C.

The results are set forth in Table 3.

TABLE 3

| Ref. Ex. 1 | 2 Weeks | 4 Weeks | 6 Weeks | Weeks |
|---|---|---|---|---|
| 3.0 mm | 15.3 | 25.4 | 40.9 | 48.6 |
| 3.7 mm | 15.8 | 22.4 | 28.9 | 39.2 |
| 4.6 mm | 7.8 | 15.5 | 23.0 | 30.2 |

We claim:

1. A process for the preparation of a slow release oxamide fertilizer comprising the steps of:
   molding by extrusion a mixture containing an oxamide powder and polyvinyl alcohol in a ratio of 0.2-10 weight parts of polyvinyl alcohol per 100 weight parts of oxamide to give a shape of a round bar having a diameter of 1.5 to 8 mm;
   cutting the molded product at a length of 1 to 1.5 times the diameter thereof to obtain a granular molded product; and
   converting the granular molded product into spherical particles by means of a rolling granulator at a rolling speed of 300 to 1000 rpm to give an oxamide powder bonded by polyvinyl alcohol in a ratio of 0.2-10 weight parts of polyvinyl alcohol per 100 weight parts of oxamide and is in the shape of spherical particles, said spherical particles having an average minor diameter of 2 to 5 mm, not less than 70% of total numbers of which have shapes in a ratio of major diameter to minor diameter of 1 to 1.3 and said powder having a repose angle not greater than 39°.

2. The process for the preparation of a slow release oxamide fertilizer of claim 1, wherein oxamide is further added to the granular molded product in the step of conversion of the product using the rolling granulator.

3. A slow release fertilizer prepared by:
   molding by extrusion a mixture containing an oxamide powder and polyvinyl alcohol in a ratio of 0.2-10 weight parts of polyvinyl alcohol per 100 weight parts of oxamide to give a shape of a round bar having a diameter of 1.5 to 8 mm;
   cutting the molded product at a length of 1 to 1.5 times the diameter thereof to obtain a granular molded product; and
   converting the granular molded product into spherical particles by means of a rolling granulator at a rolling speed of 300 to 1000 rpm to give an oxamide powder bonded by polyvinyl alcohol in a ratio of 0.2-10 weight parts of polyvinyl alcohol per 100 weight parts of oxamide and is in the shape of spherical particles, said spherical particles having an average minor diameter of 2 to 5 mm, not less than 70% of total numbers of which have shapes in a ratio of major diameter to minor diameter of 1 to 1.3 and said powder having a repose angle not greater than 39°.

4. The fertilizer of claim 3 wherein not less than 80% of total number of the spherical particles have shapes in a ratio of major diameter to minor diameter of 1 to 1.3.

5. The fertilizer of claim 3 wherein said powder has a repose angle not greater than 38.5°.

6. The fertilizer of claim 3 wherein not less than 45 weight % of the particles has a minor diameter in the range of 2.4 to 5 mm.

* * * * *